(12) United States Patent
Li et al.

(10) Patent No.: US 7,697,570 B2
(45) Date of Patent: Apr. 13, 2010

(54) METHOD BASED ON BACKBOARD TRANSMITTING TIME DIVISION MULTIPLEXING CIRCUIT DATA AND A BRIDGE CONNECTOR

(75) Inventors: Zhenya Li, Shenzhen (CN); Guzheng Wu, Shenzhen (CN); Quan Yu, Shenzhen (CN); Shoubo Xie, Shenzhen (CN); Konggang Wei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1200 days.

(21) Appl. No.: 10/476,407

(22) PCT Filed: Apr. 29, 2002

(86) PCT No.: PCT/CN02/00306

§ 371 (c)(1),
(2), (4) Date: Oct. 29, 2003

(87) PCT Pub. No.: WO02/098162

PCT Pub. Date: Dec. 5, 2002

(65) Prior Publication Data

US 2004/0120351 A1   Jun. 24, 2004

(30) Foreign Application Priority Data

Apr. 30, 2001 (CN) ............................. 01 1 15803
Aug. 21, 2001 (CN) ............................. 01 1 30714

(51) Int. Cl.
*H04J 3/00* (2006.01)
(52) U.S. Cl. ..................................... 370/498; 370/503

(58) Field of Classification Search ............... 370/376, 370/362, 428, 502, 503, 508, 535, 536, 498, 370/366, 371, 352, 355, 380, 387, 396, 304, 370/350, 395.62, 504, 505, 506, 507, 509, 370/510, 511, 512, 516, 517, 518, 276, 294, 370/321, 351, 357, 363, 364, 365, 375, 377, 370/386, 422, 442, 456, 478; 703/25; 710/317
See application file for complete search history.

(56) References Cited

U.S. PATENT DOCUMENTS

| | | | | |
|---|---|---|---|---|
| 4,916,692 | A | * | 4/1990 | Clarke et al. ................. 370/451 |
| 5,175,824 | A | * | 12/1992 | Soderbery et al. ........... 710/317 |
| 5,202,883 | A | * | 4/1993 | Hatherill et al. ............. 370/362 |

(Continued)

OTHER PUBLICATIONS

International Search Report of PCT/CN02/00306, mailed Oct. 3, 2002.

*Primary Examiner*—Frank Duong
*Assistant Examiner*—Abdullah Riyami

(57) ABSTRACT

A method for multi-path TDM data transmission includes: applying a plurality of high-speed serial lines to connect a center switch network board to a plurality of service boards; multiplexing multi-path TDM data from the center switch network board at transmitting side, and transmitting TDM data multiplexed in batch via one of the high-speed serial lines to one of the service boards; at receiving side, serial receiving the TDM data multiplexed and de-multiplexing the TDM data multiplexed to multiple TDM paths. The TDM bridge connector includes: a TDM high-speed serial transmitting adaptive circuit, and a TDM high-speed serial receiving adaptive circuit and a clock control circuit. The invention increases greatly transmission capacity and looses the requirement of clock synchronization, so the system reliability is greatly raised.

16 Claims, 9 Drawing Sheets

U.S. PATENT DOCUMENTS

| | | | |
|---|---|---|---|
| 5,331,632 A * | 7/1994 | Aaron et al. | 370/376 |
| 5,455,917 A | 10/1995 | Holeman et al. | 370/67 |
| 5,615,211 A * | 3/1997 | Santore et al. | 370/419 |
| 6,108,726 A * | 8/2000 | Runaldue et al. | 710/62 |
| 6,188,912 B1 * | 2/2001 | Struhsaker et al. | 455/561 |
| 6,542,584 B1 * | 4/2003 | Sherwood et al. | 379/88.18 |
| 6,574,333 B1 * | 6/2003 | Manchester et al. | 379/377 |
| 6,826,187 B1 * | 11/2004 | Hey et al. | 370/395.6 |
| 6,944,153 B1 * | 9/2005 | Buckland et al. | 370/376 |
| 7,042,845 B1 * | 5/2006 | Naumann | 370/235 |
| 7,054,324 B1 * | 5/2006 | Ben-Zur et al. | 370/404 |
| 2001/0033572 A1 * | 10/2001 | Caldara | 370/395 |
| 2001/0046225 A1 * | 11/2001 | Schwaller et al. | 370/343 |
| 2003/0074178 A1 * | 4/2003 | Sample et al. | 703/25 |
| 2004/0080285 A1 * | 4/2004 | Victor et al. | 315/365 |
| 2006/0013240 A1 * | 1/2006 | Ma et al. | 370/401 |
| 2007/0239429 A1 * | 10/2007 | Johnson et al. | 704/8 |

* cited by examiner

METHOD BASED ON BACKBOARD TRANSMITTING TIME DIVISION MULTIPLEXING CIRCUIT DATA AND A BRIDGE CONNECTOR

FIELD OF THE TECHNOLOGY

The invention generally relates to the time division multiplexing (TDM) technology, specifically to a TDM data transmission method on the backplane and a TDM bridge connector thereof.

BACKGROUND OF THE INVENTION

Along with the differential signal level getting lower, noise immunity and transmission rate are getting higher, it is required that the transmission capacity should be getting higher. Traditionally, the TDM centralized switching structure is shown in FIG. 1, where every service board shares the TDM bus 12, and the center switch network board distributes clock, for data transmission at backplane circuit, to each service board with a point-to-point mode or a bus mode.

Suppose that clock high-level duration is t, data is transmitted at leading edge of the clock and is sampled at falling edge of the clock, then the time sequence difference of the traditional synchronous data transmission based on backplane is shown in FIG. 2, where phase between the frame synchronization signal and the clock is not aligned. As shown in FIG. 2 the frame synchronization signal between the center switch network board and the service boards has to time delay and so does the clock between the center switch network board and the service boards, transmission time for data from the center switch network board to the service boards is $t_2=t+t_0$ and transmission time for data from the service boards to the center switch network board is only $t_1=t-t_0$. Obviously, the transmission time is asymmetric, and when the transmission frequency is very high, the system reliability is greatly reduced, which means that the system capacity cannot be further increased. Therefore, clock synchronization is a bottleneck of traditional data transmission based on backplane bus with strict synchronization.

Since the distance and distributed parameters between different slots of the backplane are different, the time delay for different slots is different. There are disadvantages for the bus mode of signal transmission: a large area, a long distance, many slots, density pins, serious switching noise and electromagnetic interference (EMI) etc., when they are not dealt with adequately, there will be serious signal reflection and interference that cause signal distortion. In this case, the transmission rate is limited for the system reliability.

In order to increase transmission capacity of backplane circuit, increasing number of transmission signals is a fundamental method, but this is implemented at a cost of a complex system structure, reliability and performance, and the number of transmission signals is limited.

In summary, the disadvantages of traditional TDM bus data transmission based on backplane is as following:

1) it requires strict synchronization, i.e. phase between the frame signal and clock signal should be aligned more strictly;

2) There are disadvantages for the bus mode of signal transmission: a large area, a long distance, many slots, density pins, serious switching noise and electromagnetic interference (EMI) etc. Strict synchronization is very difficult. The transmission rate is greatly limited in order to guarantee system reliability;

3) no matter whether the clock signal is distributed with point-to-point mode or bus mode, since the distance and distributed parameters between different slots are different, the time delay is different;

4) In order to increase transmission capacity of backplane circuit, increasing number of transmission signals is a fundamental method, but this is implemented at a cost of a complex system structure, reliability and performance, and the number of transmission signals is limited.

SUMMARY OF THE INVENTION

Considering what have been mentioned above, the invention provides a method for multi-path TDM data transmission based on backplane and a bridge connector thereof in order to reduce synchronization requirement of the clock, increase transmission rate at the backplane circuit and switching capacity, and raise data transmission quality and reliability.

A method for multi-path TDM data transmission includes:

applying a plurality of high-speed serial lines to connect the center switch network board with a plurality of service boards;

multi-path TDM data is multiplexed at the transmitting side, and transmitted in batch to one of the service boards via one of the high-speed serial lines; at the receiving side, data are serially received and de-multiplexed to every TDM path.

According to the method, at the transmitting side, the multi-path TDM data are multiplexed by taking a frame as a unit, and then transmitted in batch to said high-speed serial line on the backplane; at the receiving side, data received by the high-speed serial line are de-multiplexed to every TDM paths by taking a frame as a unit; said data serial transmitting and receiving takes the TDM clock as sampling clock.

According to the method, at the transmitting side, the multi-path TDM data are multiplexed by taking a time-slot as a unit, and then transmitted in batch to said high-speed serial line on the backplane; at the receiving side, data received by the high-speed serial line are de-multiplexed to every TDM path by taking a time-slot as a unit; said data serial transmitting and receiving takes the TDM clock as sampling clock.

According to the method, at the transmitting side, the multi-path TDM data are multiplexed by taking a bit as a unit, and then transmitted in batch to said high-speed serial line on the backplane; at the receiving side, data received by the high-speed serial line are de-multiplexed to every TDM path by taking a bit as a unit; said data serial transmitting and receiving takes n multiple of TDM clock as sampling clock, wherein n is an integer greater than zero.

The multiplexing of the multi-path TDM data, mentioned above, can also be done by a high-speed serial driver that makes parallel-to-serial conversion, and then sent to the high-speed serial line on the backplane at the transmitting side; at the receiving side, the high-speed serial driver synchronously receives the data and makes serial-to-parallel conversion to sample data for every TDM path according to the TDM frame synchronization.

According to the method, said TDM frame synchronization signal and clock signal at the receiving side can be distributed by a point-to-point mode or a bus mode.

A method for implementing said TDM Bridge connector includes:

A TDM Bridge connector for multi-path TDM data transmission includes:

A TDM high-speed serial transmitting adaptive circuit, which connects with the data signal of the TDM switching circuit and a plurality of high-speed serial lines on the backplane, receives a multi-path TDM data from the TDM switching circuit, and after multiplexing the TDM data multiplexed are sent to one of the service boards via one of the high-speed serial lines on the backplane;

A TDM high-speed serial receiving adaptive circuit, which connects with the high-speed serial line on its receiving end and the data line of the TDM switching circuit on its transmitting end, serially receives the serial data sent from the high-speed serial line, and after de-multiplexing they are sent to the TDM switching circuit;

And a clock control circuit, which is connected with the clock and sync signal of the TDM switching circuit, provides clock and sync signal.

According to the TDM bridge connector of the invention, said high-speed serial transmitting adaptive circuit further includes: a TDM receiving interface that connects with the data signal of the TDM switching circuit to receive the multi-path TDM data; a store-and-forward circuit that converts the received multi-path TDM data to one line serial data; a high-speed serial transmitting interface that connects with the high-speed serial line on the backplane to adapt and send the serial data to the high-speed serial line; said high-speed serial receiving adaptive circuit further includes: a high-speed serial receiving interface that connects with the high-speed serial line on the backplane to receive the serial data from the high-speed serial line; a store-and-forward circuit that converts the received serial data to multi-path TDM data; and a TDM transmitting interface that connects with the TDM switching circuit for sending the TDM data to the TDM switching circuit.

According to the TDM bridge connector of the invention, said high-speed serial transmitting adaptive circuit further includes: a TDM receiving interface that connects with the data signal of the TDM switching circuit to receive the multi-path TDM data; a parallel-to-serial circuit that converts the received multi-path TDM data to one line serial data; a high-speed serial transmitting interface that connects with the high-speed serial line on the backplane to adapt and send the serial data to the high-speed serial line; said high-speed serial receiving adaptive circuit further includes: a high-speed serial receiving interface that connects with the high-speed serial line on the backplane to receive the serial data from the high-speed serial line; a serial-to-parallel circuit that converts the received serial data to multi-path TDM data; and a TDM transmitting interface that connects with the TDM switching circuit for sending the TDM data to the TDM switching circuit.

Said high-speed serial transmitting adaptive circuit further includes a clock multiple frequency circuit that provides a multiple frequency of the clock signal acting as a clock for the high-speed serial data transmission; said high-speed serial receiving adaptive circuit further includes a multiple frequency of the clock signal as a clock for the high-speed serial data receiving.

Furthermore, the high-speed serial receiving adaptive circuit can also include a store-and-forward circuit; and the high-speed serial transmitting adaptive circuit includes a clock multiple frequency circuit that provides a multiple frequency of the TDM switching circuit clock signal as a clock signal for transmitting high-speed serial data.

Said high-speed serial line includes a downward transmission line from the center switch network board to the service boards and an upward transmission line from the service boards to the center switch network board.

Said high-speed serial line includes a TDM data sending line, a TDM data receiving line, a TDM frame sync line and a clock line.

The invention takes a high-speed serial line on backplane to connect the center switch network board and every service board and to multiplex or interleave/de-multiplex or de-interleave the multi-path TDM data for transmission in batch; in this way, the transmission rate and switching capacity on backplane are greatly increased and at the same time the accurate requirement of the transmission clock phase is decreased, and source of signals on backplane is saved; in addition, because of using the differential transmission mode the noise interference and EMI are reduced. Consequently, data transmission quality and reliability of the system is greatly increased.

EMBODIMENTS OF THE INVENTION

The invention will be described in more detail with reference to the drawings.

Figure 1:
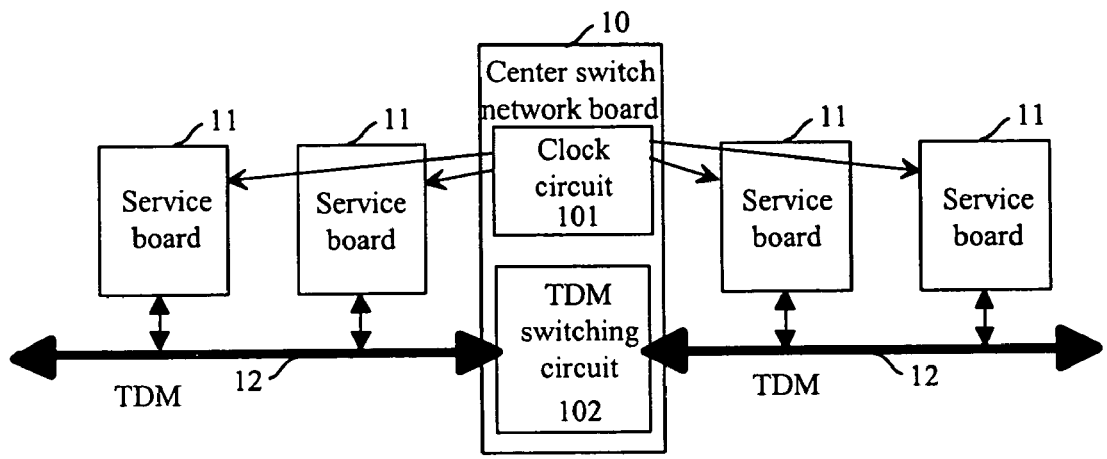
FIG. 1 shows a diagram of the traditional TDM concentrated switching structure.
Figure 2:
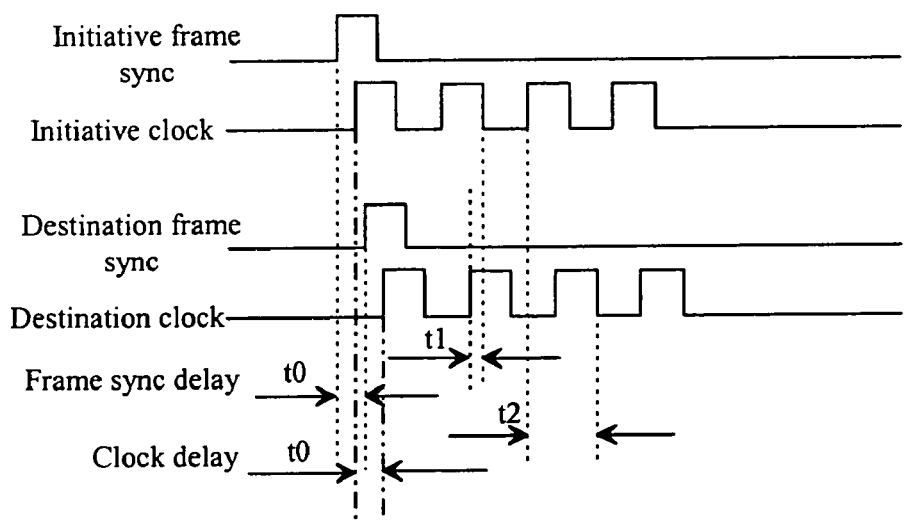
FIG. 2 shows a time delay of the traditional TDM clock concentrated distributing.
Figure 3:
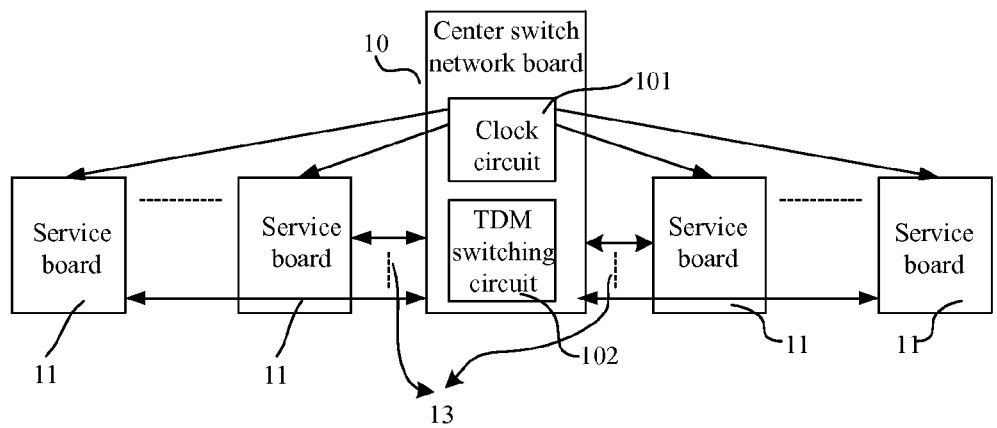
FIG. 3 shows the diagram of a TDM concentrated switching with high-speed serial line.

FIG. 3 shows a diagram of the invention for TDM concentrated switching with high-speed serial line. The clock circuit 101 of the center switch network board 10 provides synchronous and clock signal, which can be distributed by point-to-point mode or bus mode, to service boards 11. Between the TDM switching circuit 102 and the service boards 11 there is a high-speed serial line 13 for data transmission with point-to-point mode.

Figure 4:
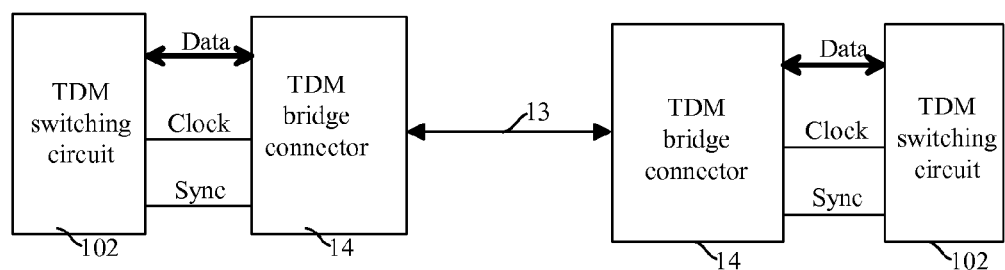
FIG. 4 shows the diagram of a TDM switching with TDM bridge connector.

FIG. 4 shows a TDM switching structure with TDM bridge connector for the invention. Data, clock and sync signals of the TDM switching circuit 102 are all connected to the TDM bridge connector 14. After multiplexed/de-multiplexed, the TDM data from the TDM switching circuit are transmitted by the TDM bridge connector 14 through the high-speed serial line 13 on the backplane.

The TDM bridge connector 14 includes: a TDM high-speed serial transmitting adaptive circuit connected with the data signal of the TDM switching circuit on the one end and with the high-speed serial line at the backplane on the another end, which receives multi-path TDM data transmitted by the TDM switching circuit and sends them to the high-speed serial lines after multiplexing or interleaving and adapting; a high-speed serial receiving adaptive circuit connected with the high-speed serial lines on the one end and with the data signal of the TDM switching circuit on the other end, which receives serial data transmitted by the high-speed serial line and sends them to the TDM switching circuit after adapting and de-multiplexing or de-interleaving; and a clock control circuit connected with the clock and sync signals of the TDM switching circuit, which generates clock and sync signals.

Figure 5:
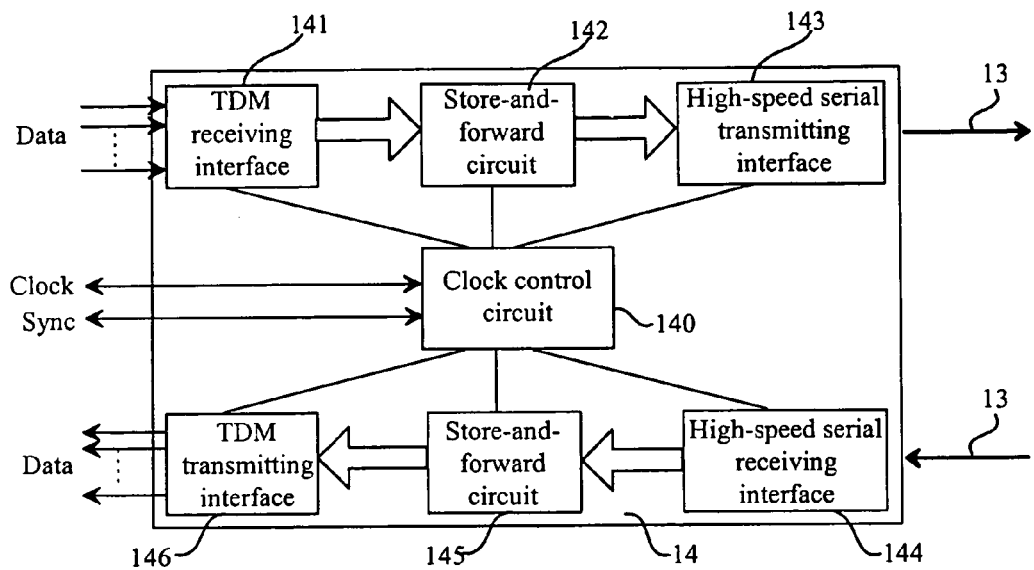
FIG. 5 shows an embodiment of the TDM bridge connector.

FIG. 5 shows an embodiment of the TDM bridge connector 14. The TDM high-speed serial transmitting adaptive circuit includes: a TDM receiving interface 141, which is connected with the data signal of the TDM switching circuit to receive the multi-path TDM data; a store-and-forward circuit 142, which converts the received multi-path TDM data into one-path serial data; and a high-speed serial transmitting interface 143, which is connected with the high-speed serial line 13 on the backplane to make adaptation for the serial data and send them to the high-speed serial line. The high-speed serial receiving adaptive circuit includes: a high-speed serial interface 144, which is connected with the high-speed serial line 13 and receives the high-speed serial data; a store-and-forward circuit 145, which converts the received serial data into multi-path TDM data; and a TDM transmitting interface 146, which is connected with the TDM switching circuit to send the multi-path TDM data.

The clock control circuit 140 is connected with the clock and sync signals of the TDM switching circuit and provides the clock signal to the TDM high-speed serial transmitting adaptive circuit and the TDM high-speed serial receiving adaptive circuit.

Figure 6:
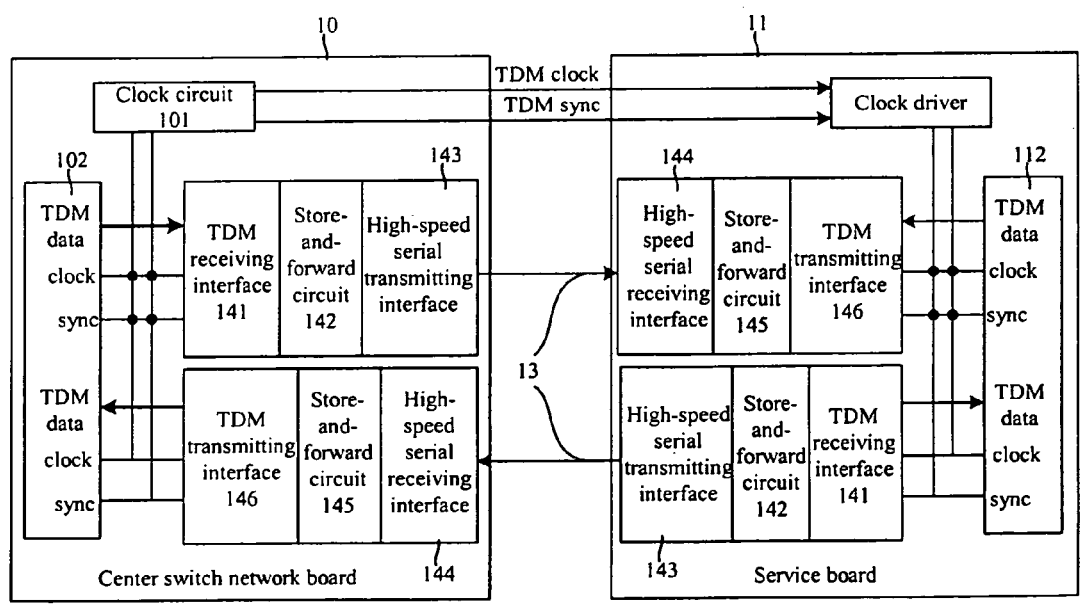
FIG. 6 shows the diagram of connection between the center switch network board and service boards in the FIG. 5 embodiment.
Figure 7:
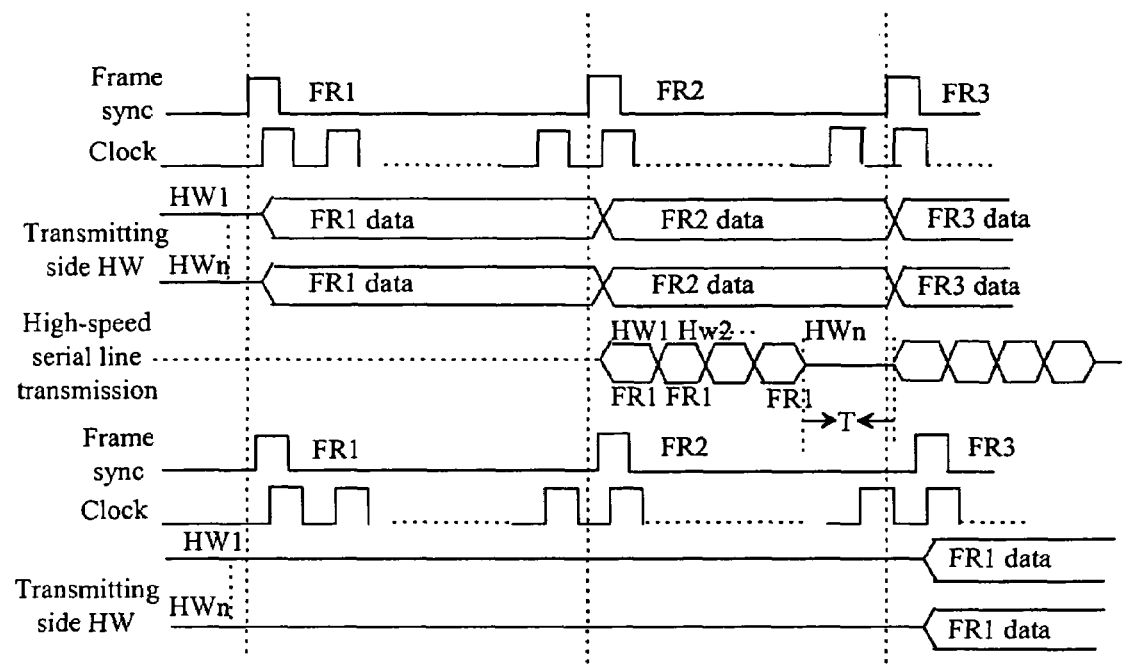
FIG. 7 shows a time sequence diagram for multi-path data transmission when taking a frame as a unit.

FIG. 6 shows a block diagram of the center switch network board and a service board with the FIG. 5 embodiment. Taking a frame as a unit, FIG. 7 shows a time sequence for the multi-path data transmission. The center switch network board provides high-way (HW) sync and clock signals to every service board, and the data is transmitted at the leading edge of the clock and sampled at the falling edge of the clock. It can be seen from the FIG. 7 that when the time T is guaranteed, reliability of data transmission is guaranteed too and it is insensitive to the clock delay. Therefore, when transmission quality of the clock is satisfied the system requirement, distribution of the clock can be a point-to-point mode or a bus mode.

Suppose the bandwidth of the high-speed serial line is 200 Mbps, when combining six data signals and each of them being 32M, the bandwidth 6×32=192 Mbps are occupied. So, there is enough redundancy for increasing the traffic of each service board when using the high-speed serial line for transmission.

In FIG. 7, the Fri (i=1, 2, 3 . . . ) represents frames, it is n times of the usual TDM period of a frame, wherein frequency of the frame can be 8 k i.e. 8 k frame, n is a integer greater than zero; for example, the period of 8 k frame is 125 μs, the period of Fri can be 125 μs, 250 μs or 375 μs etc. depending on the system design. The data transmission procedure on the high-speed serial line of FIG. 7 is as the followings:

1) During the first frame, i.e. FR1, the adaptive circuit of the high-speed serial line on the sending end assembles all HWs data in the FR1.

2) During second frame, i.e. FR2, the adaptive circuit of high-speed serial line on the sending end sends the FR1 data to the adaptive circuit of high-speed serial line on the receiving end through the high-speed serial line.

3) During third frame, i.e. FR3, the adaptive circuit of the high-speed serial line on the receiving end de-multiplexes the received FR1 data and sends to corresponding HW, respectively. FR1 data is transferred to the TDM switching circuit of the destination board.

Really, the data transmission procedure mentioned above is a batching transmission procedure taking a frame as a unit.

The disadvantage of high-speed serial data transmission with a frame as a unit is that there is a two-frame fixed time delay. When using multi-frame multiplexing, i.e. taking n frames as a unit for every HW, or interleaved multiplexing, i.e. interleaving multiple HWs data in frames accordingly; the time delay will be n times of the single frame multiplexing. So, it is right in theory but inapplicable for implementation.

Figure 8:
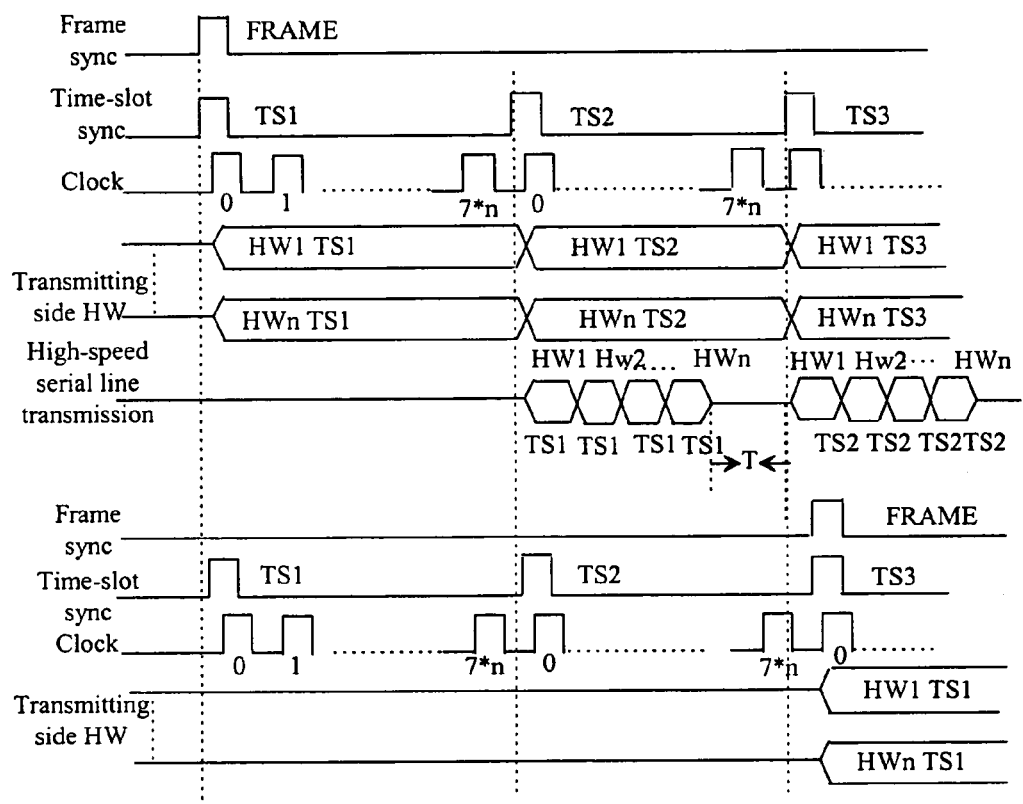
FIG. 8 shows a time sequence diagram for multi-path data transmission when taking a time-slot as a unit.

FIG. 8 shows a time sequence for the multi-path data transmission when taking a time-slot as a unit. The central switching board provides the frame synchronization signal and clock signal to HWs of every service board; and the data is transmitted at leading edge of the clock and sampled at falling edge of the clock. It can be seen from FIG. 8 that the data transmission is reliable only requiring that the time T in FIG. 8 to be guaranteed; and the data transmission is insensible to the clock delay. Consequently, when transmission quality of the clock is satisfied the system requirement, the clock distribution can be a point-to-point mode or a bus mode.

Suppose the bandwidth of the high-speed serial line is 200 Mbps, it can combine five data signals and each of them is 32M, and the bandwidth 5×32=160 Mbps are occupied. So, there is enough redundancy for increasing the traffic of each service board when using the high-speed serial line for transmission.

In FIG. 8 the FRAME represents a frame, which is 8 k frame and has a period of 125 μs; the TS is a time-slot, which is an integer multiple of the usual TDM time-slot. For example, a 2M HW has a time-slot of eight clocks time, and the TS can be 16 clocks time or 24 clocks time etc. depending on the system design. The data transmission procedure on the high-speed serial line of FIG. 8 is as the following:

1) During the first time-slot, i.e. TS1, the adaptive circuit of the high-speed serial line on the sending end assembles all HWs data in the TS1.

2) During second time-slot, i.e. TS2, the adaptive circuit of high-speed serial line on the sending end sends the TS1 data to the adaptive circuit of high-speed serial line on the receiving end through the high-speed serial line.

3) During third TS, i.e. TS3, the adaptive circuit of the high-speed serial line on the receiving end de-multiplexes the received TS1 data and sends to corresponding HW, respectively. TS1 data is transferred to the TDM switching circuit of the destination board.

Really, the data transmission procedure mentioned above is a batching transmission procedure taking a time-slot as a unit.

The disadvantage of the data transmission with a time-slot as a unit is that each transfer will bring in a two time-slots fixed time delay, as shown in FIG. 8. Since the data pass the center switch network board twice, there are four time-slots fixed time delay, i.e. 4×Tts, wherein the Tts is a time-slot period. As the data stream has a two time-slots shift, data stream at the interface devices of the transmitter and receiver of the boards has phase differences; it is necessary to have a phase adjusting circuit in front of the interface device to guarantee that the phases are coincidence.

Figure 9:
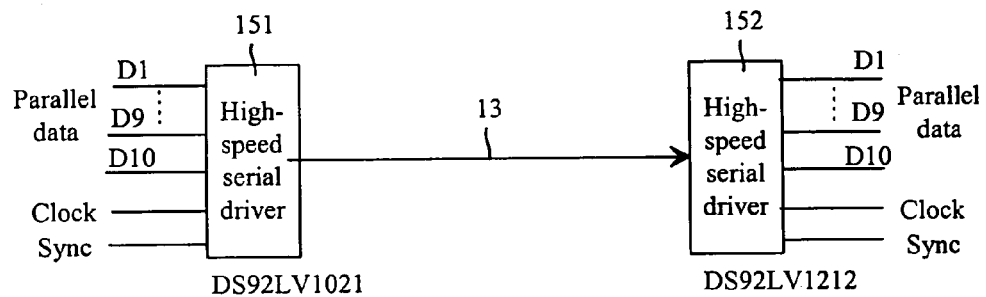
FIG. 9 shows the diagram of a high-speed serial driver.

In the above multi-path TDM data transmission, the multiplexing/de-multiplexing is implemented at the store-and-forward circuit; it can also be implemented with a parallel-to-serial/serial-to-parallel circuit. FIG. 9 shows a TDM bridge connector implemented with the high-speed serial drivers: the serial transmitter DS92LV1021 (151) and the serial receiver DS92LV1212 (152) of the National Semiconductor (NS) Company products.

Figure 10:
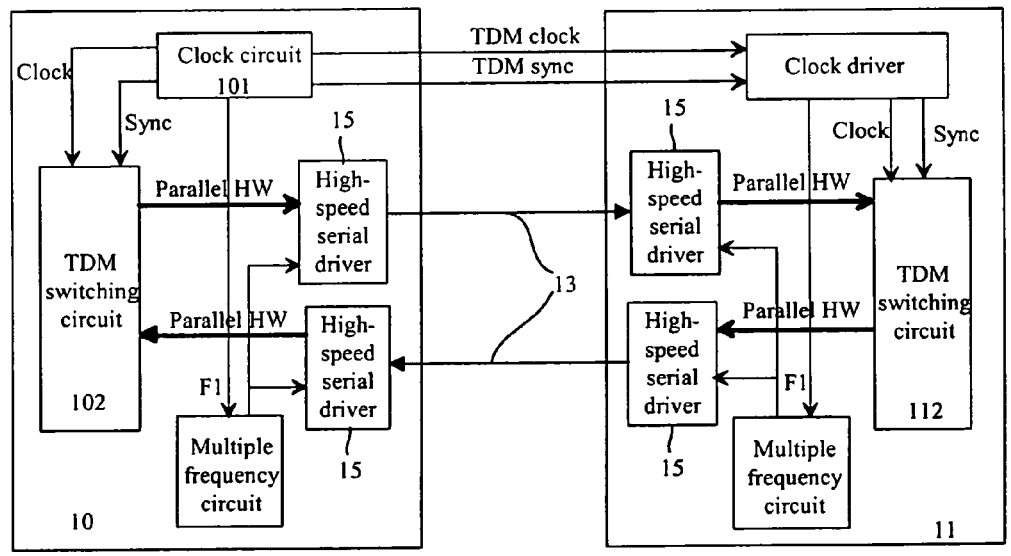
FIG. 10 shows the diagram of connection between the center switch network board and service boards in the FIG. 9 embodiment.
Figure 11:
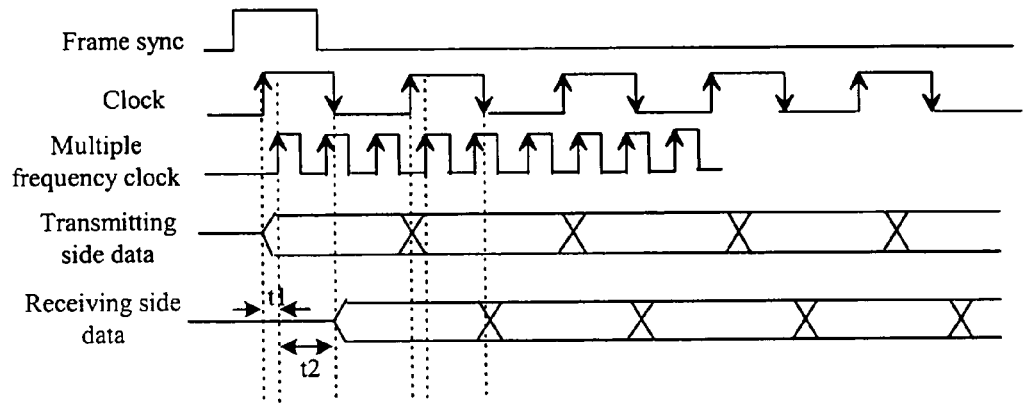
FIG. 11 shows a time sequence diagram of multi-path data transmission by using synchronous multiplexing/de-multiplexing.

FIG. 10 shows a block diagram of a center switch network board and a service board for data transmission, where high-speed serial drivers implement the TDM bridge connector. When the multi-path data transmission applies a synchronous multiplexing/de-multiplexing mode, the time sequence is shown in FIG. 11. The clock distribution can be a point-to-point mode or a bus mode when transmission quality of clock satisfies the system requirement. The clock circuit 101 on the center switch network board 10 provides to every service board the HW frame synchronous signal and HW clock signal, and data is transmitted at the leading edge and sampled at the falling edge of the HW clock signal. It can be seen from FIGS. 10 and 11, the multiple frequency circuit 16 generates n multiple HW clock (n is a integer greater than 0). On the transmitting end, the high-speed serial driver 15 samples the HWs data and sends them to the high-speed serial line 13 at the leading edge of the multiple frequency clock; and on the receiving end, the TDM switching circuit samples the data outputted from the high-speed serial driver 15 at the falling edge of the HW clock.

FIG. 11 shows a three multiple HW clock case. At the sending end, after t1 duration when the TDM switching circuit sent the HW data, the high-speed serial driver samples data at the leading edge of the multiple frequency clock and sends them to the high-speed serial line; and at the receiving end, the TDM switching circuit samples data at the falling edge of the HW clock and there is t2 duration in between. The disadvantage of the synchronous multiplexing/de-multiplexing mode is that the huge capacity of the high-speed serial line cannot be used thoroughly. At present the point-to-point high-speed serial line can have gigabits rate, but TDM transmission capacity of each high-speed serial line is limited by parallel number of high-speed driver.

Figure 12:
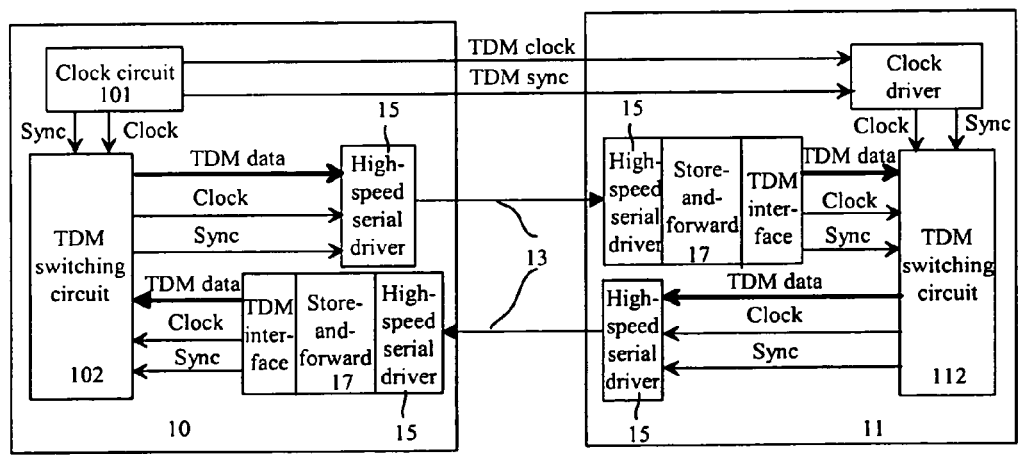
FIG. 12 shows the diagram of connection between the center switch network board and service boards by using synchronous transmission and store-and-forward for multi-path data transmission.
Figure 14:
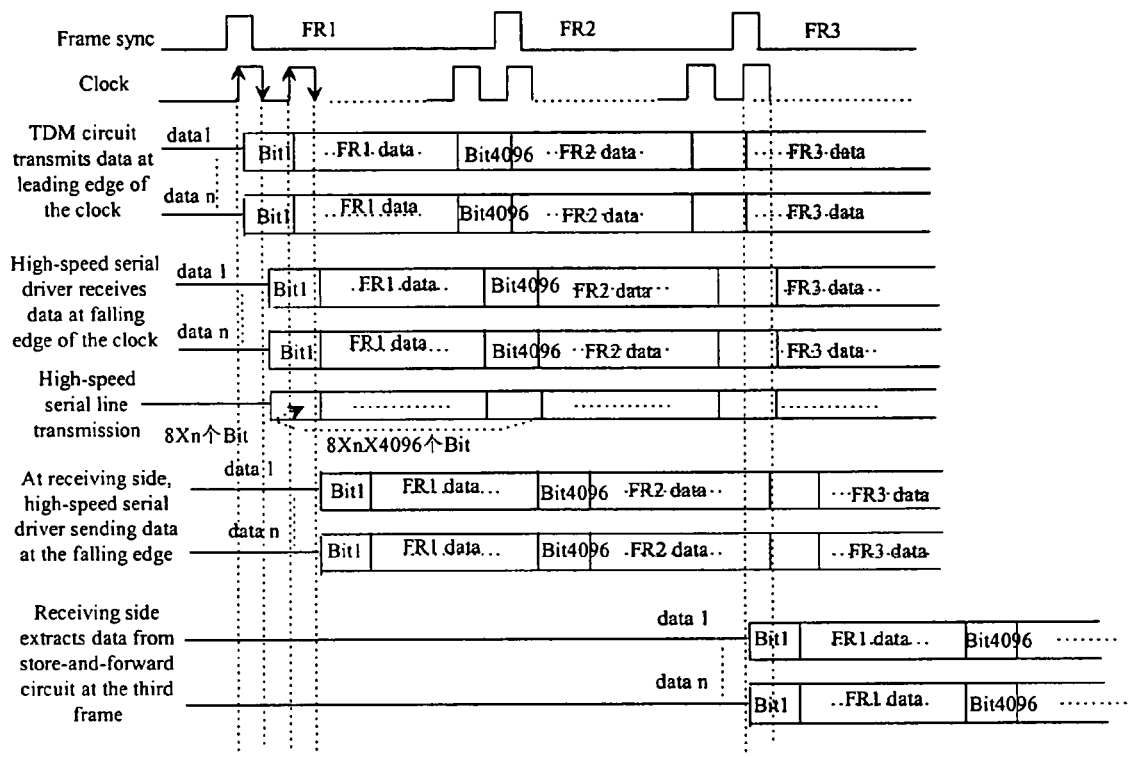
FIG. 14 shows a time sequence diagram of using synchronous transmission and store-and-forward for multi-path data transmission.

FIG. 12 shows a block diagram of a center switch network board and a service board for multi-path data transmission with synchronous transmission and store-and-forward circuit; the time sequence is shown in FIG. 14. In this diagram, suppose the TDM clock is 32 MHz, the central control board 10 provides the TDM frame synchronizing signal and the TDM clock signal to every service board 11; the data is transmitted at the leading edge and sampled at the falling edge of the TDM clock.

In FIG. 12, multiple-paths TDM data are transmitted parallel to the high-speed serial driver 15, i.e. multiple TDM data lines are connected with the parallel data lines of the high-speed serial driver 15; clock of the high-speed serial driver at transmitting end is provided by the TDM switching circuit and the high-speed serial driver at receiving end outputs clock signal to the TDM switching circuit. The TDM switching circuit can distribute clock signals with point-to-point mode or bus mode.

Suppose that the high-speed serial driver has 10 parallel data lines, then its transmission capacity is 32×10=320 Mbps, i.e. it can combine 10 data signals with 32 Mbps. Therefore, with high-speed serial line, there is enough extended redundancy for increasing service traffic at every service board.

In FIG. 14, the Fri (i=1, 2, 3 . . . ) represents frames, which is 8 k frame and has a period of 125 μs. The data transmission procedure on the high-speed serial line of FIG. 14 is shown in the following:

1) During first frame, i.e. FR1, the TDM switching circuit at transmitting end transmits data at the leading edge of the clock; and the parallel data lines of the high-speed serial driver sample data at the falling edge of the clock and sends them to the high-speed serial line. The high-speed serial line transmits 8×n bits in one clock period and 8×n×4096 bits in a frame period.

2) During second frame, i.e. FR2, the high-speed serial driver of the receiving end receives synchronously the FR1 data on the high-speed line at the falling edge of the clock and sends synchronously to the store-and-forward circuit 17 at the receiving end at the falling edge of the clock.

3) During third frame, i.e. FR3, the store-and-forward circuit 17 at the receiving end sends the received FR1 data to the TDM switching circuit at the clock leading edge strictly according to the requirement of TDM frame time sequence, and the TDM switching circuit samples the data at the falling edge.

The above three steps performs the FR1 TDM data transmission. Repeat this procedure to perform the FR2, FR3 . . . data transmission.

Figure 13:
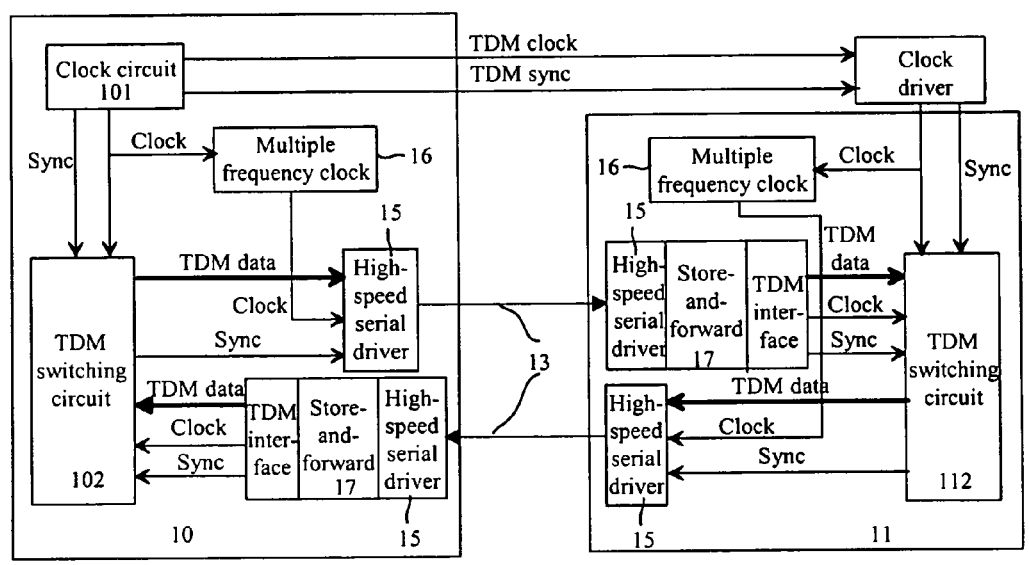
FIG. 13 shows the diagram of connection between the center switch network board and service boards by using synchronous transmission and store-and-forward for multi-path data transmission and adding a clock double frequency circuit.

FIG. 13 shows a block diagram of a center switch network board and a service board for data transmission with synchronous transmission circuit and the store-and-forward circuit, adding multiple frequency clock circuit 16. The clock of the high-speed serial driver can be n times of the TDM switching circuit clock, wherein n is integer greater than 0. The objective is to make the high-speed serial driver at the transmitting end sample a TDM data earlier, but this is nonsense and will increase cost and decrease reliability.

The disadvantage of this synchronous transmission and store-and-forward mode is that there is a two-frames fixed time delay, as shown in FIG. 14. When using the center switch network board to implement TDM concentrated switching, first the data are sent from a service board to the center switch network board, then forwarded to the interface board; this will cause a four frames fixed time delay, i.e. $4 \times T_{fr}$, wherein the $T_{fr}$ represents time period of one frame. When using multi-frame multiplexing, i.e. taking multi-frame as a unit for every HW, or interleaved multiplexing, i.e. interleaving multiple HWs data in frames accordingly; the time delay will be n times of the single frame multiplexing. So, it is inapplicable from the technology point of view.

In summary, the four embodiments can be compared in the following:

1) In the capacity aspect, the multi-path data transmission modes taking a frame as a unit or a time-slot as a unit can bring capacity of the high-speed serial driver into full play and have biggest capacity, but with higher cost; the synchronous transmission and store-and-forward mode can bring the parallel ports capacity of the high-speed serial driver into full play and have moderate capacity and cost; the synchronous multiplexing/de-multiplexing mode has smaller capacity and little cost.

2) In the time sequence aspect, the multi-path data transmission modes taking a frame as a unit or a time-slot as a unit and the synchronous transmission and store-and-forward mode are insensitive to the clock delay, but the synchronous multiplexing/de-multiplexing mode is more sensitive to the clock delay.

The high-speed serial line used in this invention includes not only the transmitting and receiving lines but also the TDM frame synchronous signal lines and clock lines. Signals on the high-speed serial line are differential signals.

The invention proposes a method for data transmission with the high-speed serial line on the backplane; and the method greatly increases the transmission capacity and looses the requirement of clock synchronization; with making use of the advantages of high-speed serial signals, the system reliability is increased greatly. The method has the following effects:

1) It is insensitive to the clock delay; in the traditional TDM data transmission on the backplane, the clock delay brings an unsymmetrical available transmission time and therefore brings an unreliable problem in the system. In the invention, above problems are solved.

2) It can provide a large capacity. High-speed serial line brings qualitative change on TDM data transmission capacity. At present the point-to-point high-speed serial line can have more than one Gigabits rate, and each high-speed line can transfer TDM data with several Mbps bandwidth.

3) The high-speed serial line are all differential line, so they have good suppression ratio for common-mode interference and better EMI characteristic, which can guarantee data integrity during high speed transmission.

4) At present, the communication system is transited from the narrowband to wideband and the wideband system uses high-speed serial line on the backplane with great capacity for data packets transmission, so using high-speed serial line on the backplane is coincidence with the technical development trend.

The method for data transmission with high-speed serial line based on backplane has been described in detail, but it is not limited in the embodiments mentioned above. Any revision or equivalent replacement within the spirit and scope of the invention should be covered by the scope of the Claims.

The invention claimed is:

1. A method for multi-path TDM data transmission comprising:
   applying a plurality of high-speed serial lines to connect a center switch network board with a plurality of service boards respectively, wherein the center switch network board provides a sync signal and a clock signal to, and exchanges TDM data with, each of the plurality of service boards via a respective one of the high-speed serial lines;
   obtaining, by the center switch network board, multi-path TDM data according to the sync signal and the clock signal, multiplexing, by the center switch network board, the multi-path TDM data and transmitting the TDM data multiplexed in batch to the plurality of service boards via the plurality of high-speed serial lines;
   receiving, by the plurality of service boards, the TDM data multiplexed, and de-multiplexing the TDM data multiplexed to the multi-path TDM data according to the sync signal and the clock signal;
   wherein said obtaining multi-path TDM data according to the sync signal and the clock signal, multiplexing the multi-path TDM data and transmitting the TDM data multiplexed in batch to the plurality of service boards via the plurality of high-speed serial lines comprises:
      at a first frame, obtaining all High Ways data transmitted in the first frame;
      at a second frame, transmitting the High Ways data obtained in the first frame to the receiving side via the plurality of high-speed serial lines;
      wherein said receiving the TDM data multiplexed and de-multiplexing the TDM data multiplexed to the multi-path TDM data according to the sync signal and the clock signal comprises at a third frame, receiving the High Ways data obtained in the first frame and de-multiplexing the High Ways data to respective High Way.

2. A method for multi-path TDM data transmission comprising:
   applying a plurality of high-speed serial lines to connect a center switch network board with a plurality of service boards respectively, wherein the center switch network board provides a sync signal and a clock signal to, and exchanges TDM data with, each of the plurality of service boards via a respective one of the high-speed serial lines;
   obtaining, by the center switch network board, multi-path TDM data according to the sync signal and the clock signal, multiplexing, by the center switch network board, the multi-path TDM data and transmitting the TDM data multiplexed in batch to the plurality of service boards via the plurality of high-speed serial lines;
   receiving, by the plurality of service boards, the TDM data multiplexed, and de-multiplexing the TDM data multiplexed to the multi-path TDM data according to the sync signal and the clock signal;
   wherein said obtaining multi-path TDM data according to the sync signal and the clock signal, multiplexing the multi-path TDM data and transmitting the TDM data multiplexed in batch to the plurality of service boards via the plurality of high-speed serial lines comprises:
      at a first slot, obtaining all High Ways data transmitted in the first slot;
      at a second slot, transmitting the High Ways data obtained in the first slot to the receiving side via the plurality of high-speed serial lines;
      wherein said receiving the TDM data multiplexed and de-multiplexing the TDM data multiplexed to the multi-path TDM data according to the sync signal and the clock signal, comprises
   at a third slot, receiving the High Ways data obtained in the first slot and de-multiplexing the High Ways data to respective High Way.

3. The method according to claim 1, wherein said obtaining multi-path TDM data, multiplexing the multi-path TDM data and transmitting the TDM data multiplexed in batch according to the sync signal and the clock signal comprises:
   at a leading edge of a multiple frequency clock, sampling all High Ways data, multiplexing the High Ways data and sending the all High Ways data multiplexed via the plurality of high-speed serial lines, and
   wherein said receiving the TDM data multiplexed comprises:
   at a falling edge of the multiple frequency clock, receiving all the High Ways data via the plurality of high-speed serial lines;
   wherein the multiple frequency clock is an n multiple of a TDM clock that is used for the transmitting and receiving, and n is an integer greater than zero.

4. The method according to claim 3, wherein multiplexing the High Ways data comprises:
   converting the High Ways data from parallel to serial by a high-speed serial driver, and then sending the converted High Ways data to the plurality of high-speed serial lines;
   at receiving side, the high-speed serial driver synchronously receiving the converted High Ways data, making serial-to-parallel conversion, and sampling each path of TDM data according to the sync signal.

5. The method according to claim 1, wherein the sync signal and the clock signal are transmitted from the center switch network board to each of the plurality of service boards by a point-to-point mode or a bus mode.

6. A TDM bridge connector for multi-path TDM data transmission comprising:
- a TDM high-speed serial transmitting adaptive circuit, connected with a TDM switching circuit and a plurality of high-speed serial lines, wherein the plurality of high-speed serial lines are respectively connected with a plurality of service boards, the TDM high-speed serial transmitting adaptive circuit is adapted to receive multi-path TDM data from said TDM switching circuit, multiplex the multi-path TDM data and send the TDM data multiplexed to of the plurality of service boards via the plurality of high-speed serial lines according to a sync signal and a clock signal received from a clock circuit of a center switch network board;
- a TDM high-speed serial receiving adaptive circuit, connected with the plurality of high-speed serial lines and the TDM switching circuit, receive serial data sent from the plurality of high-speed serial lines, and convert the serial data to the multi-path TDM data and send the multi-path TDM data to the TDM switching circuit according to the sync signal and the clock signal;
- and a clock control circuit, configured to receive the sync signal and the clock signal from the clock circuit of the center switch network board and provide the clock signal and the sync signal to the TDM high-speed serial transmitting adaptive circuit and the TDM high-speed serial receiving adaptive circuit;
- wherein the TDM high-speed serial transmitting adaptive circuit comprises:
  - a TDM receiving interface, configured to connect to the TDM switching circuit and receive the multi-path TDM data transmitted by the TDM switching circuit;
  - a first store-and-forward circuit, configured to convert the multi-path TDM data received by the TDM receiving interface to one path serial data by performing the steps of: at a first frame, obtaining all High Ways data transmitted in the first frame; and at a second frame, transmitting the High Ways data obtained in the first frame to the receiving side via the plurality of high-speed serial lines; and
  - a high-speed serial transmitting interface, configured to connect with the high-speed serial lines and send the serial data to the high-speed serial lines;
- wherein the TDM high-speed serial receiving adaptive circuit further comprises:
  - a high-speed serial receiving interface, configured to connect with the high-speed serial lines and receive serial data transmitted by the high-speed serial lines;
  - a second store-and-forward circuit, configured to convert the received serial data to multi-path TDM data; and
  - a TDM transmitting interface, configured to connect with the TDM switching circuit and send the multi-path TDM data to the TDM switching circuit.

7. A TDM bridge connector for multi-path TDM data transmission comprising:
- a TDM high-speed serial transmitting adaptive circuit, connected with a TDM switching circuit and a plurality of high-speed serial lines, wherein the plurality of high-speed serial lines are respectively connected with a plurality of service boards, the TDM high-speed serial transmitting adaptive circuit is adapted to receive multi-path TDM data from said TDM switching circuit, multiplex the multi-path TDM data and send the TDM data multiplexed to the plurality of service boards via the plurality of high-speed serial lines according to a sync signal and a clock signal received from a clock circuit of a center switch network board;
- a TDM high-speed serial receiving adaptive circuit, connected with the plurality of high-speed serial lines and the TDM switching circuit, receive serial data sent from the plurality of high-speed serial lines, and convert the serial data to the multi-path TDM data and send the multi-path TDM data to the TDM switching circuit according to the sync signal and the clock signal;
- and a clock control circuit, configured to receive the sync signal and the clock signal from the clock circuit of the center switch network board and provide the clock signal and the sync signal to the TDM high-speed serial transmitting adaptive circuit and the TDM high-speed serial receiving adaptive circuit;
- wherein the TDM high-speed serial transmitting adaptive circuit comprises:
  - a TDM receiving interface, configured to connect with the TDM switching circuit and receive the multi-path TDM data transmitted by the TDM switching circuit;
  - a parallel-to-serial circuit, configured to convert the received multi-path TDM data to one path serial data by performing the steps of: at a first slot, obtaining all High Ways data transmitted in the first slot; and at a second slot, transmitting the High Ways data obtained in the first slot to the receiving side via the plurality of high-speed serial lines; and
  - a high-speed serial transmitting interface, configured to connect with the plurality of high-speed serial lines and send serial data to the plurality of high-speed serial lines after adapting;
- wherein the TDM high-speed serial receiving adaptive circuit comprises:
  - a high-speed serial receiving interface, configured to connect with the plurality of high-speed serial lines and receive serial data transmitted by the plurality of high-speed serial lines;
  - a serial-to-parallel circuit, configured to convert received serial data to multi-path TDM data; and
  - a TDM transmitting interface, configured to connect with the TDM switching circuit and send TDM data to the TDM switching circuit.

8. The TDM bridge connector according to claim 7, wherein the high-speed serial transmitting adaptive circuit is a high-speed serial driver; the high-speed serial receiving adaptive circuit is a high-speed serial driver.

9. The TDM bridge connector according to claim 7, wherein the high-speed serial transmitting adaptive circuit further comprises a clock multiple frequency circuit configured to multiply the TDM switching circuit clock signal and provide a multiple frequency as a high-speed serial transmission clock signal;
the high-speed serial receiving adaptive circuit further comprises a clock multiple frequency circuit configured to multiply TDM switching circuit clock signal and provide a multiple frequency as a high-speed serial receiving clock signal.

10. The TDM bridge connector according to claim 8, said high-speed serial receiving adaptive circuit further comprises a store-and-forward circuit connecting with the high-speed serial driver.

11. The TDM bridge connector according to claim 10, wherein the high-speed serial transmitting adaptive circuit further comprises a clock multiple frequency circuit configured to multiply the TDM switching circuit clock signal and provide a multiple frequency as a high-speed serial transmitting clock signal.

12. The TDM bridge connector according to claim 7, wherein the plurality of high-speed serial lines comprise downward transmission lines from the center switch network board to the service boards and upward transmission lines from the service boards to the center switch network board.

13. The TDM bridge connector according to claim 7, wherein the plurality of high-speed serial lines comprise a TDM data transmission line, a TDM data receiving line, a TDM frame sync line and a clock line.

14. The method according to claim 2, wherein said obtaining multi-path TDM data, multiplexing the multi-path TDM data and transmitting the TDM data multiplexed in batch according to the sync signal and the clock signal comprises:
   at a leading edge of a multiple frequency clock, sampling all High Ways data, multiplexing the High Ways data and sending the all High Ways data multiplexed via the plurality of high-speed serial lines, and
   wherein said receiving the TDM data multiplexed comprises:
   at a falling edge of the multiple frequency clock, receiving all the High Ways data via the plurality of high-speed serial lines;
   wherein the multiple frequency clock is an n multiple of a TDM clock that is used for the transmitting and receiving, and n is an integer greater than zero.

15. The method according to claim 14, wherein multiplexing the High Ways data comprises:
   converting the High Ways data from parallel to serial by a high-speed serial driver, and then sending the converted High Ways data to the plurality of high-speed serial lines;
   at receiving side, the high-speed serial driver synchronously receiving the converted High Ways data, making serial-to-parallel conversion, and sampling each path of TDM data according to the sync signal.

16. The method according to claim 2, wherein the sync signal and the clock signal are transmitted from the center switch network board to each of the plurality of service boards by a point-to-point mode or a bus mode.

* * * * *

UNITED STATES PATENT AND TRADEMARK OFFICE
CERTIFICATE OF CORRECTION

| | |
|---|---|
| PATENT NO. | : 7,697,570 B2 |
| APPLICATION NO. | : 10/476407 |
| DATED | : April 13, 2010 |
| INVENTOR(S) | : Zhenya Li et al. |

Page 1 of 1

It is certified that error appears in the above-identified patent and that said Letters Patent is hereby corrected as shown below:

In the Claims:

Column 10, Line 53, Claim 3 (Amendment dated 12/23/09, Page 5, Line 3, Claim 4): "n" should be --$n$--.

Column 10, Line 55, Claim 3 (Amendment dated 12/23/09, Page 5, Line 4, Claim 4): "n" should be --$n$--.

Column 11, Line 13, Claim 6 (Amendment dated 12/23/09, Page 6, Line 8, Claim 7): "to of the" should be --to the--.

Column 14, Line 4, Claim 14 (Amendment dated 12/23/09, Page 11, Line 10, Claim 16): "n" should be --$n$--.

Column 14, Line 6, Claim 14 (Amendment dated 12/23/09, Page 11, Line 11, Claim 16): "n" should be --$n$--.

Signed and Sealed this

Thirteenth Day of July, 2010

David J. Kappos
*Director of the United States Patent and Trademark Office*